United States Patent
Scholl et al.

(10) Patent No.: US 6,850,836 B1
(45) Date of Patent: Feb. 1, 2005

(54) METHOD AND SYSTEM FOR ASSESSING COMBUSTION NOISE IN AN INTERNAL COMBUSTION ENGINE

(75) Inventors: David Scholl, Huntington Woods, MI (US); Urs Christen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/662,732

(22) Filed: Sep. 15, 2003

(51) Int. Cl.[7] ............................................. G01M 15/00
(52) U.S. Cl. ..................... 701/115; 73/119 A; 73/116
(58) Field of Search ............................. 701/115, 102; 73/117.3, 116, 119 A

(56) References Cited

U.S. PATENT DOCUMENTS 4,102,181 A * 7/1978 Cser et al. ................ 73/119 A
5,345,916 A * 9/1994 Amann et al. .............. 123/506
5,809,152 A * 9/1998 Nakamura et al. ......... 381/71.8
5,932,801 A   8/1999 Akishita et al.

FOREIGN PATENT DOCUMENTS

| EP | 1209458 A1 | 5/2002 |
| EP | 1221603 A1 | 7/2002 |
| JP | 2001055955 | 2/2001 |

OTHER PUBLICATIONS

"Translation–Invariant Data Visualization with Orthogonal Discrete Wavelets", Davld J. Scholl; IEEE Transactions on Signal Processing, vol. 46, No. 7, Jul. 1998, pp. 20312034.

* cited by examiner

*Primary Examiner*—Hieu T. Vo

(57) ABSTRACT

A method for assessing noise generated during combustion in an internal combustion engine, such method comprising determining a noise index by processing a signal generated in a cylinder of such engine in accordance with a shift invariant wavelet transform.

17 Claims, 6 Drawing Sheets

METHOD AND SYSTEM FOR ASSESSING COMBUSTION NOISE IN AN INTERNAL COMBUSTION ENGINE

TECHNICAL FIELD

This invention relates generally to internal combustion engines and more particularly to methods and systems for assessing combustion noise in such engines.

BACKGROUND

As is known in the art, it would be desirable to have combustion noise of diesel engines to be on the same level as or less than that of gasoline engines. To achieve this, the noise is measured during development when the engine control strategy is calibrated. Noise can be measured with microphones in anechoic chambers; but, these chambers are rather expensive. Hence, during development, noise is usually assessed in a different, cheaper way. Combustion noise of internal combustion engines can be derived by use of a device for measuring the pressure in the cylinder. Such noise assessment, in the form of a noise index, may be obtained by filtering an "in-cylinder" pressure sensor signal and then taking its root mean square (RMS) value. An additional advantage of cylinder pressure derived noise assessment is that measurements can also be collected in a vehicle on the road or on a dynamometer test stand.

As is also known in the art, a method for determining noise levels of an internal combustion engine is described in European Patent Application EP1209458 assigned to the same assignee as the present invention. Such patent application describes the use of a shift variant wavelet transform. Wavelet transforms can be compared to a Fourier transform. As for the latter, the signal's frequency content is revealed. However, wavelet transforms are more powerful because they allow localizing signal properties both in time (or space) and frequency at the same time. For the noise index application, two properties of the wavelet transform are utilized: Firstly, the wavelet transform is equivalent to bandpass filtering. By retaining only certain levels of the wavelet transform, the frequency content of the transformed signal can be chosen. Secondly, the wavelet transform with orthogonal wavelets preserves the energy of the signal (Parseval theorem). Thus, the RMS value can be computed from the transformed signal rather than the filtered original signal. The advantage of the wavelet approach to noise index computation over the traditional filtering approach is that it is computationally less intensive (depending on the order of the wavelets) and that additional information for other applications can be extracted from the wavelet transformed signal at the same time.

More particularly, referring to FIG. 1, the time-continuous waveform is fed to a sampler with such samples to produce the approximate signal, $\lambda_0$. The approximate signal, $\lambda_0$, is fed to a one-step wavelet transformer. The one step wavelet transformer (1 step wvlt tf) includes a high pass filter (HPF) and a low pass filter (LPF) for, after downsampling the produced data samples by a factor of 2, produce an new approximate signal, $\lambda_1$, from the LPF and a first detail signal or coefficient, $\gamma_1$, from the HPF, as shown. The process repeats feeding into the next succeeding wavelet transformer the preceding approximate signal.

Thus, a wavelet transform decomposes a signal into one approximation signal and several detail signals. The transform is done by filtering and down-sampling the original signal repeatedly, which leads to detail signals with band limited frequency contents. The FIR filters applied for the wavelet transform are the lowpass and highpass filters. The detail signal's frequency content is given by the frequency bands of the highpass filter; whereas, the frequency content of the approximation signal is limited by the frequency band of the lowpass filter. A Parseval theorem relates the signal transformed with orthogonal wavelets to the signal energy in a window containing n samples:

$$\int |f(x)|^2 dx = \sum_{l=1}^{n/2^N} |\lambda_{N,l}|^2 + \sum_{j=1}^{N} \sum_{k=1}^{n/2^j} |\gamma_{j,k}|^2$$

where N is the number of wavelet transform steps, j is an index running over all these steps, and k and l are indices running over all the elements in the respective signals.

For the wavelet-based noise meter, only the detail signals of those levels, or wavelet steps are retained whose frequency bands cover the frequency range of interest, i.e., the frequency band of a traditional noise meter. Once the right levels, $j_m$, of the wavelet transform have been chosen, the wavelet based noise index, $NI_{WVL}$, is defined as:

$$NI_{WVL} = 20 \cdot \log_{10}\left(\frac{c}{n} \cdot \sqrt{\sum_{j_m} \sum_k |\gamma_{j_m,k}|^2}\right) \quad \text{Equation (1)}$$

where c is a scaling factor to adjust the absolute noise level, n is the number of samples of the original signal, and k is the number of the n samples being used in the computation of equation (1), where k runs from 1 to n and is therefore referred to herein as a "running index".

Thus, a batch of n samples of the in-cylinder pressure signal is taken for each cylinder per engine cycle. Each one of the samples in the batch of the n samples is designated by an index k, where k runs from 1 to n. For each batch, one noise index $NI_{WVL}$ is calculated in accordance with equation (1) above. Thus, for each crankshaft revolution of a four-cylinder engine, there are two batches with n samples each, and a noise index $NI_{WVL}$ is calculated every 180 degrees crank angle.

SUMMARY

In accordance with the present invention, a method is provided for assessing noise generated during combustion in an internal combustion engine, such method comprising determining a noise index by processing a signal generated in a cylinder of such engine in accordance with a shift invariant wavelet transform.

In one embodiment, the noise index, $NI_{WVL}$, is:

$$NI_{WVL} = 20 \cdot \log_{10}\left(\frac{c}{n} \cdot \sqrt{\sum_{j_m} \frac{1}{2^{j_m}} \sum_k |\gamma_{j_m,k}|^2}\right)$$

where c is a constant used for scaling, n is the number of samples of the pressure signal being transformed, $j_m$ indicates the $j_m$th level of the shift invariant wavelet transform, and k is the running index.

In one embodiment, the signal is processed to assess the combustion noise associated with pilot fuel injection.

In one embodiment, such pilot injection noise assessment is made by considering only that part of the signal lying in a crank angle interval between start of injection for pilot fuel injection and for main fuel injection.

In one embodiment, a method is provided for assessing noise generated during combustion in an internal combustion engine. The method comprising determining a noise index by processing samples of a signal generated in a cylinder of such engine in accordance with a shift invariant wavelet transform. The processed samples are only samples taken during a window less than a full cylinder cycle.

In one embodiment, the noise assessment is made during operation of the engine and the noise index is used to adjust a fuel injection parameter, such the timing of the fuel injection into the cylinders and/or the quantity of the fuel injected into the cylinders.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
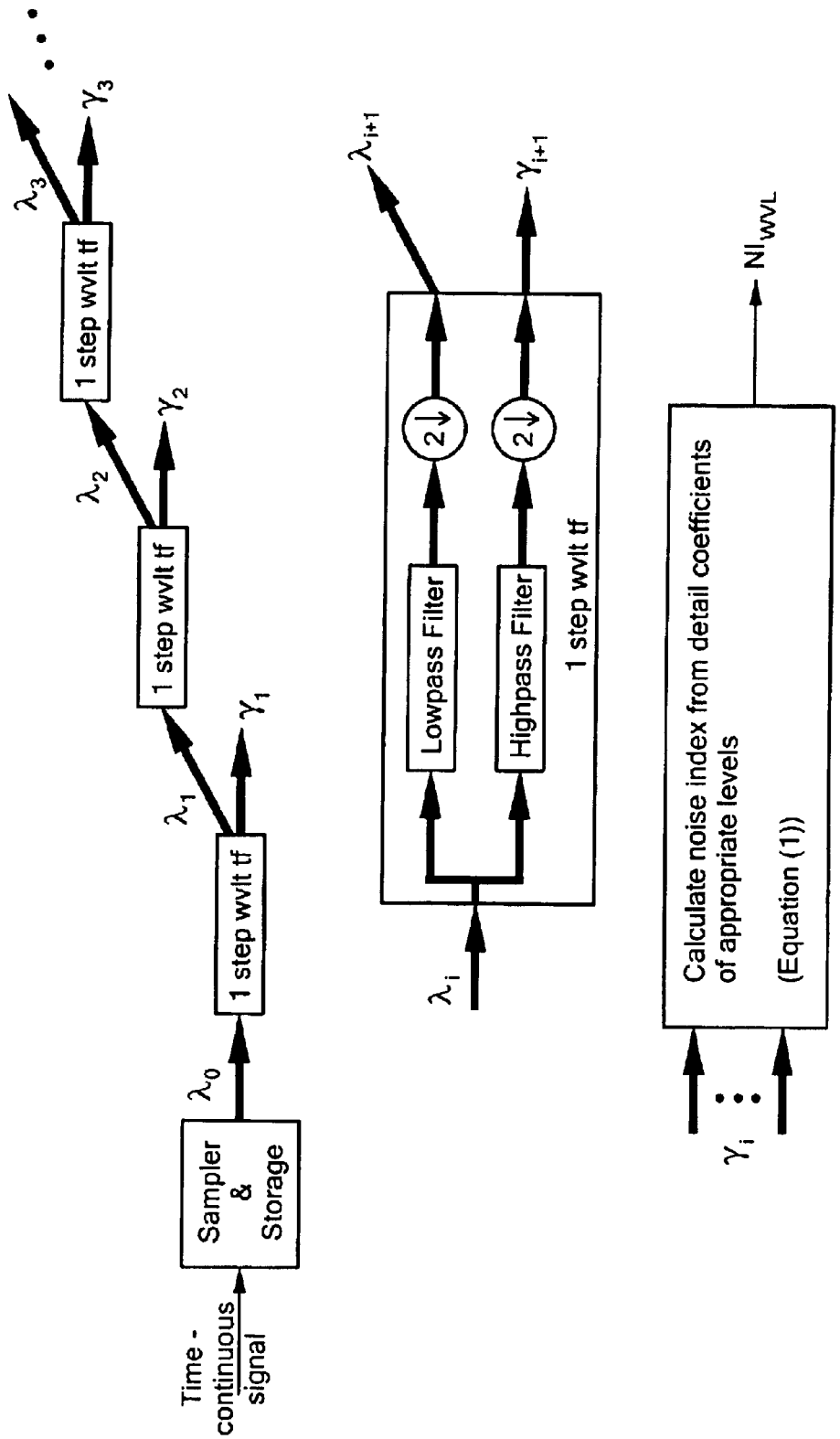
FIG. 1 is a block diagram of a shift variant wavelet transform used to assess noise in accordance with the PRIOR ART.
Figure 2:
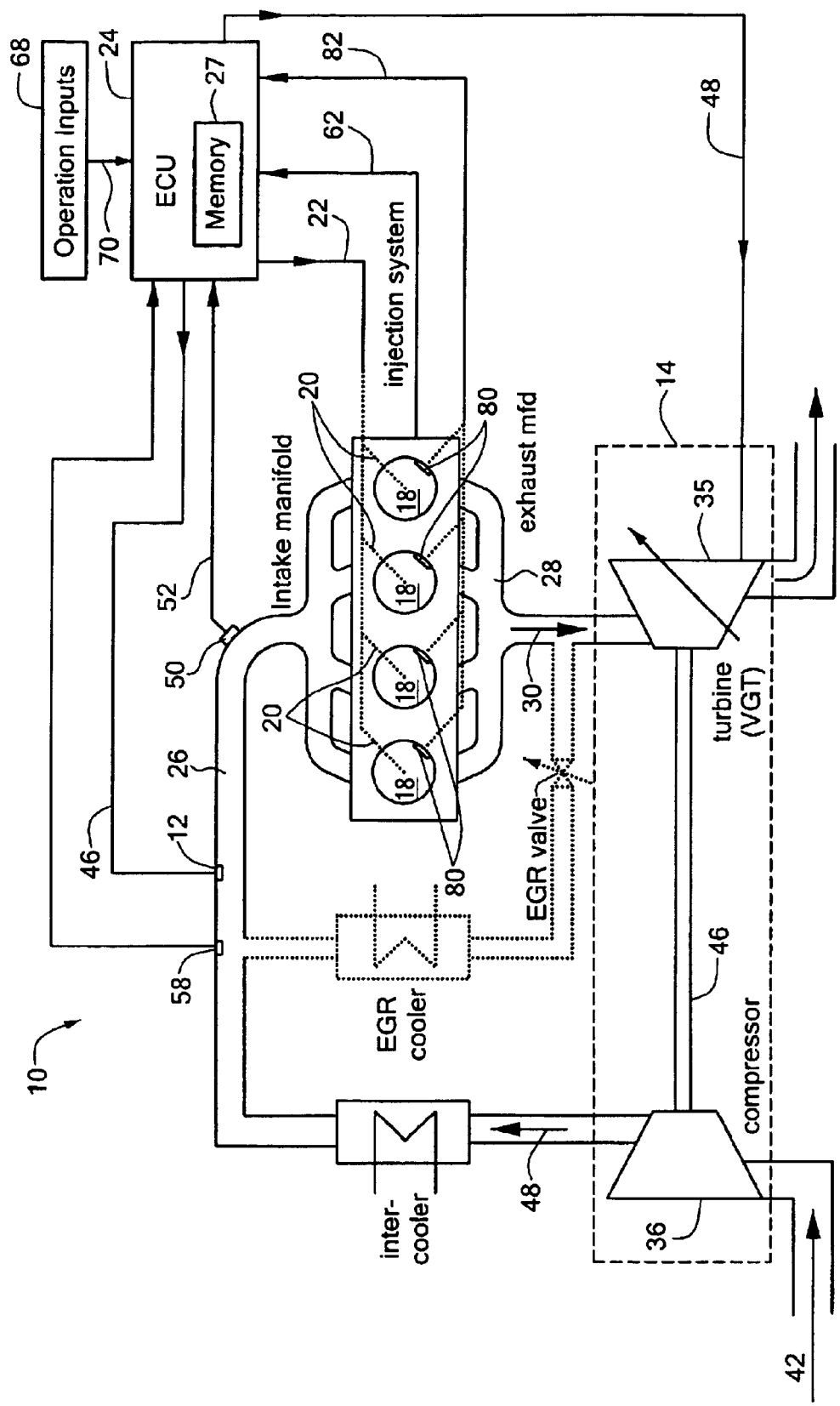
FIG. 2 is simplified block diagram of an internal combustion engine system having combustion noise assessment according to the invention, such noise assessment being used to adjust fuel injection parameters of the engine during operation of such engine according to the invention; such as fuel timing and/or fuel quantity.

Referring now to FIG. 2, a simplified schematic diagram of an internal combustion engine system 10, here a diesel engine system, is shown. The engine system 10 is here equipped with variable geometry turbocharger (VGT) 14 it being understood that a fixed geometry turbocharger may be used. A representative engine block 16 is shown having four combustion chambers 18, it being understood that additional (or fewer) combustion chambers may be used. Each of the combustion chambers 18 includes a direct-injection fuel injector 20. The duty cycle of the fuel injectors 20 is determined by the engine control unit (ECU) 24 and transmitted to the individual injectors via signal bus 22. Air enters the combustion chambers 18 through the intake manifold 26, and combustion gases are exhausted through the exhaust manifold 28 in the direction of arrow 30.

The turbocharger 14 uses exhaust gas energy to increase the mass of the aircharge delivered to the engine combustion chambers 18. The exhaust gas flowing in the direction of arrow 30 drives the turbine 35. This larger mass of air can be burned with a larger quantity of fuel, resulting in more torque and power as compared to naturally aspirated, non-turbocharged engines.

The turbocharger 14 consists of a compressor 36 and a turbine 35 coupled by a common shaft 40. The exhaust gas 30 drives the turbine 35 which drives the compressor 36 which, in turn, compresses ambient air 42 and directs it (arrow 43) into the intake manifold 26 via an electronically controlled throttle 12, it being understood that with a diesel engine a throttle need not be included.

All of the engine systems, including the throttle system 12, VGT 14 and fuel injectors 20 are controlled by the ECU 24. More particularly, the ECU 24 has a storage medium 27, here a semiconductor chip, for storing a program (i.e., computer code) to execute the processes described herein. For example, a control signal on line 46 from the ECU 24 regulates the throttle 12 position, and a control signal on line 48 regulates the position of the VGT guide vanes 44. Sensors and calibratable lookup tables provide the ECU 24 with engine operating information. For example, manifold absolute pressure (MAP) sensor 50 provides a MAP (i.e., $P_{intake}$) signal 52 to the ECU 24 indicative of the pressure in the intake manifold 26. Additional sensor inputs can also be received by the ECU along signal line 62 such as engine coolant temperature and engine speed. Additional operator inputs 68 are received along signal 70, for example as accelerator pedal position.

Here, the fuel injection signals supplied to the injectors 20 are adjusted from nominal injection timing and/or fuel quantity signals provided by any conventional strategy by an assessment of noise generated in the cylinders 18 due to the combustion therein in accordance with a shift-invariant wavelet transform described below. Suffice it to say here that the pressure generated by such combustion is detected by pressure sensors 80 disposed along walls of the cylinders 18, typically disposed in the cylinder head. The pressure sensor signals from each of the cylinder sensors 80 are individually fed to the ECU via a bus 82. More particularly, as discussed above, traditional wavelet transforms are shift-variant. The inventors have discovered that the use of the above traditional, shift-variant wavelet transforms on the pressure sensor signal for noise assessment results in a statistical standard deviation of the wavelet-based noise index which is larger than for the traditional filtering-based noise index. More particularly, the inventors have discovered that, depending on the start of the sampling of the pressure signal waveform, i.e., the sampling window start time, the signal energy in a frequency band of interest (i.e., the sound frequency band of the human ear, e.g., 600 Hz to 6 kHz) is captured in a wavelet coefficient level (i.e., $\gamma$ level, $\gamma_m$) other that the $\gamma$ level being observed as corresponding to the frequency band of interest, here 600 Hz to 6 kHz.

Figure 3A:
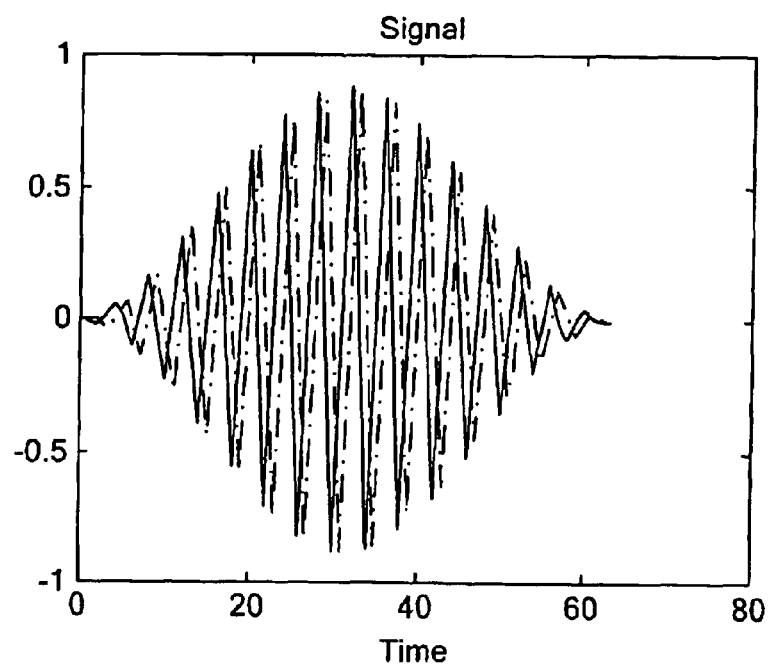
FIG. 3A is the time history of a waveform, the solid curve and the doted curves being offset one from the other by one sampling interval.
Figure 3B:
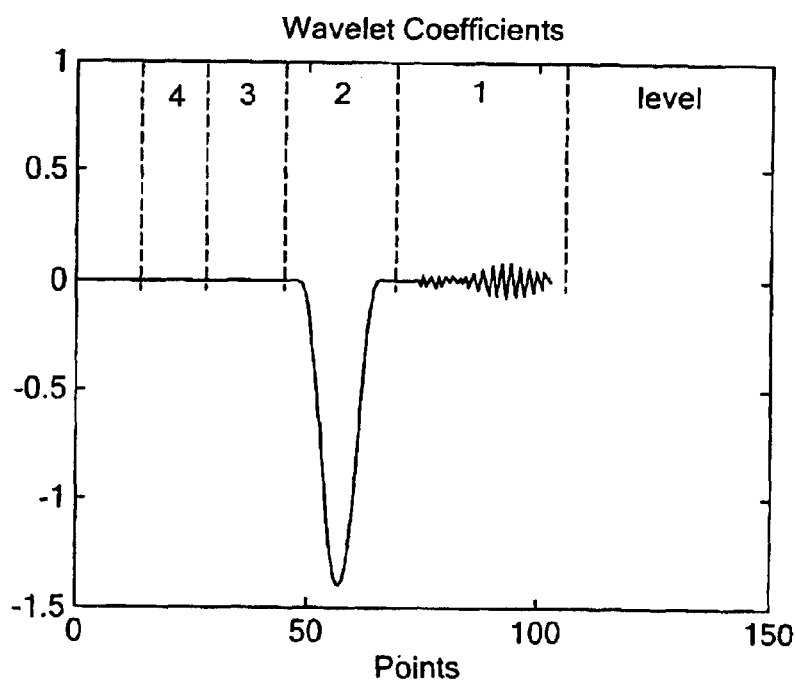
FIG. 3B shows shift variant wavelet transform coefficients taken using samples of the solid curve in FIG. 3A according to the PRIOR ART.

More particularly, referring to FIG. 3A, the solid curve shows the time history of a waveform and FIG. 3B shows the magnitude of the wavelet coefficients using a shift-variant wavelet transform. Assume that the frequency band of interest, here 600 Hz to 6 kHz, corresponds to $\gamma$ levels 2 and 3. From FIG. 3B, the presence of significant energy in the frequencies corresponding to levels 2 and 3, is observed.

Figure 3C:
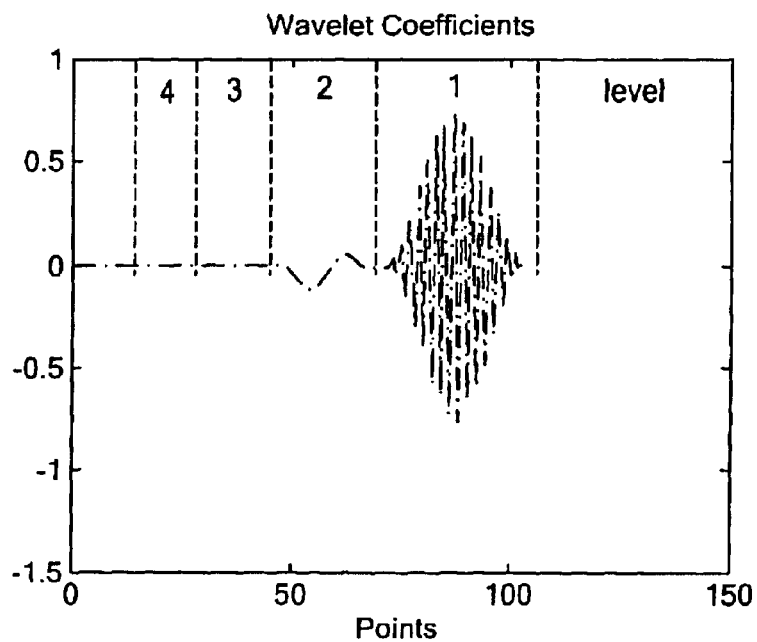
FIG. 3C shows shift variant wavelet transform coefficients taken using samples of the dotted curve in FIG. 3A according to the PRIOR ART.

However, if the sampling window was shifted one sample, as shown by the dotted curve in FIG. 3A, significant energy for the waveform of FIG. 3A would not appear in either observed γ level 2 or 3, but rather would appear in an unobserved γ level, here γ level 1, as shown in FIG. 3C. Thus, the results of a normal, shift-variant wavelet transform depend on the exact starting time of sampling as shown from FIGS. 3A, 3B and 3C.

Figure 3D:
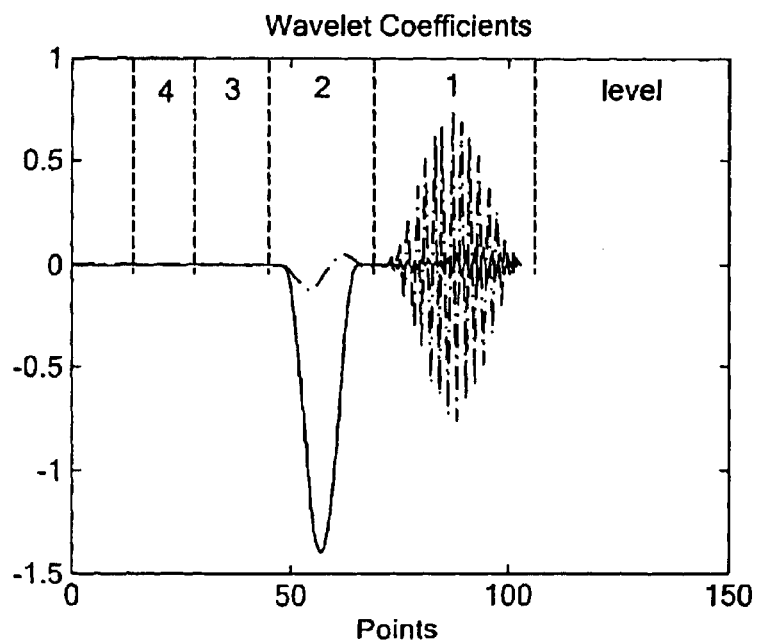
FIG. 3D shows a portion of the shift invariant wavelet transform coefficients taken using samples of either the solid curve of the dotted the dotted curve in FIG. 3A and processed according to the invention.

As described above, with traditional, shift variant wavelet transforms the coefficients for identical time-shifted signals differ. Shift-invariant transforms avoid this dependence on the initial sample by introducing redundancy. Reference is made to an article entitled "Translation-Invariant Data Visualization with Orthogonal Discrete Wavelets", by David J. Scholl, IEEE Transactions on Signal Processing, Vol. 46, No. 7, July 1998, pages 2031–2034, the entire subject matter thereof being incorporated herein by reference. At each step, the transform is applied twice, shifted by one sample. Thus, instead of getting either the solid line or the dash-dotted line in FIGS. 3B and 3C, both lines are obtained as shown in FIG. 3D regardless of whether the signal shown by the solid line in FIG. 3A is sampled with or without a one sample delay.

Hence, with shift-invariant wavelet transforms, the results for identical time-shifted signals are equal. Loosely speaking, the normal wavelet transform is doubled at each level for shift-invariant transforms by applying a second transform to the data points, shifted by one sample.

Figure 4:
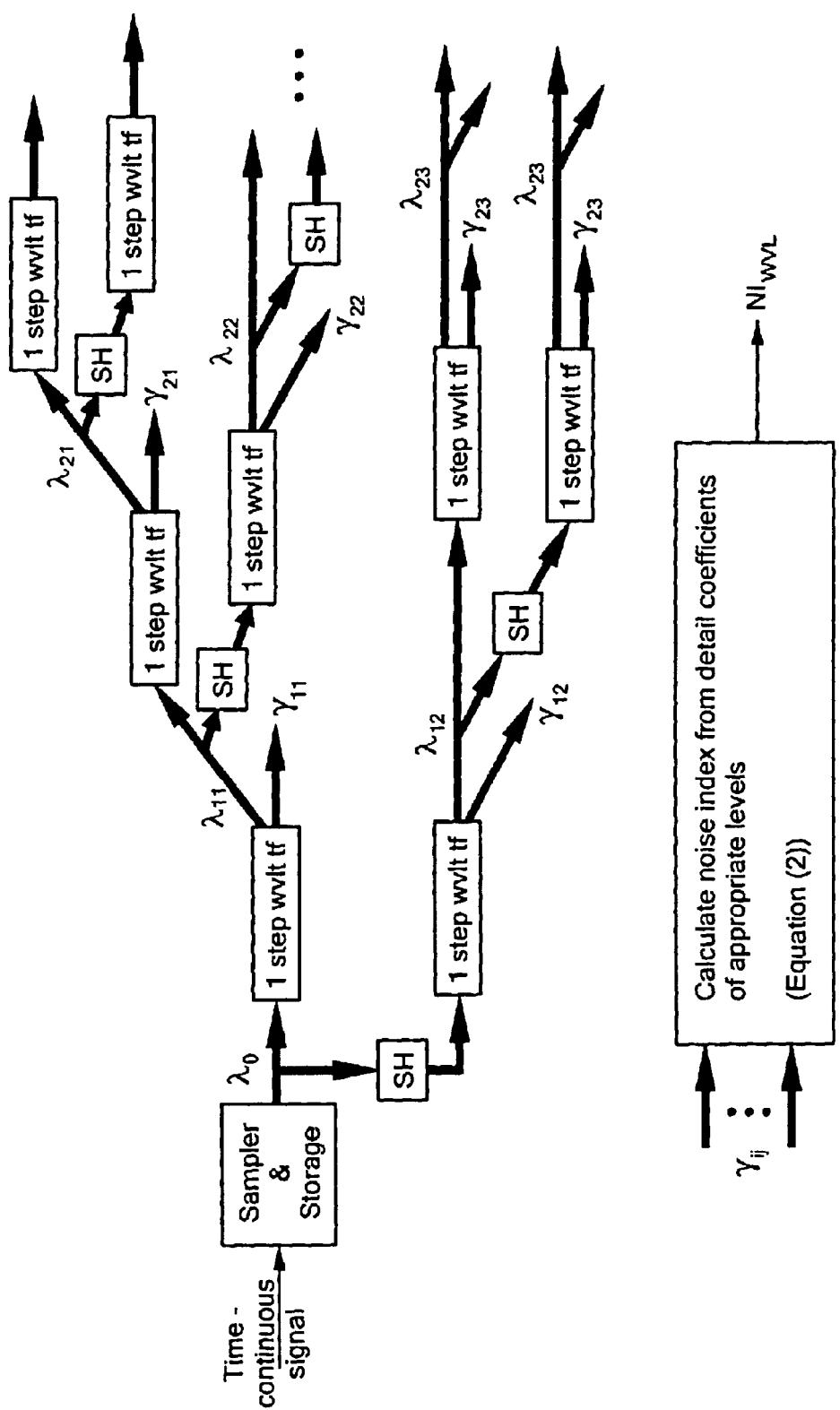
FIG. 4 is a block diagram of a shift invariant wavelet transform used to assess noise in accordance with the invention.

More particularly, and referring to FIG. 4, the original signal, $\lambda_0$, containing n samples, is wavelet transformed in the normal way (starting with the data point $\lambda_0(1)$) leading to the approximation signal $\lambda_{11}$ of length n/2 and the detail coefficients $\gamma_{11}$, also of length n/2. A second wavelet transform is applied to $\lambda_0$, this time starting with data point $\lambda_2(2)$, i.e., after a one-sample shift, SH, is applied to the signal $\lambda_0$. This leads to $\lambda_{12}$ and $\gamma_{12}$, both of length n/2 as well.

Now the obtained approximation signal, $\lambda_{11}$, containing n/2 samples, is wavelet transformed in the normal way leading to the approximation signal $\lambda_{21}$ of length n/4 and the detail coefficients $\gamma_{21}$, also of length n/4. Also, the obtained approximation signal, $\lambda_{11}$, containing n/2 samples, is wavelet transformed in the normal way after the one-sample shift SH, leading to the approximation signal $\lambda_{22}$ of length n/4 and the detail coefficients $\gamma_{22}$, also of length n/4. The process continues as described for as many detail coefficient levels as desired.

Likewise, the obtained approximation signal, $\lambda_{12}$, containing n/2 samples, is wavelet transformed in the normal way leading to the approximation signal $\lambda_{23}$ of length n/4 and the detail coefficients $\gamma_{23}$, also of length n/4. Also, the obtained approximation signal, $\lambda_{12}$, containing n/2 samples, is wavelet transformed in the normal way after the one-sample shift SH, leading to the approximation signal $\lambda_{23}$ of length n/4 and the detail coefficients $\gamma_{24}$, also of length n/4. The process continues as described for as many detail coefficient levels as desired.

The process thus produces detail coefficients, $\gamma_{1i}$, (each of length n/2) and detail coefficients $\gamma_{2i}$, (each of length n/4), etc. Each level has a total number of detail and approximation coefficients of n; therefore, the computational effort is no longer reduced at each level, as for the shift-variant wavelet transform.

Due to the redundancy introduced in the shift-invariant wavelet transform, the energy contained in each level of the detail coefficients needs to be scaled. Hence, the noise index is now defined as:

$$NI_{WVL} = 20 \cdot \log_{10}\left(\frac{c}{n} \cdot \sqrt{\sum_{j_m} \frac{1}{2^{j_m}} \sum_k |\gamma_{j_m,k}|^2}\right) \quad \text{Equation (2)}$$

where c is a constant used for scaling, n is the number of samples of the waveform being transformed, $j_m$ indicates the level, and k is the running index. This compares to the noise index for the shift-variant method described above in Equation (1).

Thus, a batch of n samples of the in-cylinder pressure signal is taken for each cylinder per engine cycle. Each one of the samples in the batch of the n samples is designated by an index k, where k runs from 1 to n. For each batch, one noise index $NI_{WVL}$ is calculated in accordance with equation (2) above. Thus, for each crankshaft revolution of a four-cylinder engine, there are two batches with n samples each, and a noise index $NI_{WVL}$ is calculated every 180 degrees crank angle.

It should be noted that instead of applying the wavelet transform to pressure data covering all 720 deg of a complete cylinder cycle, it is applied to only a small, relevant portion of the pressure trace, e.g., a window, from 20 deg before (the firing) top dead center to 100 deg after TDC. With this windowing, all the "diluting" information, which is known not to contain anything related to combustion, is excluded, thus increasing the sensitivity of the noise meter to the combustion.

Thus, n samples are taken of the pressure signal associated with each one of the engine cylinders between –40 and 100 degrees around Top Dead Center (TDC). These samples form one batch which samples for a batch are process at the end of that window. A calculation is made of all the vectors γ and λ (i.e., $\gamma_{1i}$ and $\lambda_{1i}$ containing each n/2 numbers; $\gamma_{2i}$, $\lambda_{2i}$ each containing n/4 numbers; etc.), and then the noise index $NI_{WVL}$ is calculated from the calculated γ vectors. In the end, one noise index number, $NI_{WVL}$, is determined per batch (i.e., for each engine cycle and for each one of the engine's cylinders individually). Thus, one noise index number, $NI_{WVL}$ number is calculated per stroke, i.e., one number per 180 degrees of engine crankshaft for a four-cylinder engine.

The samples for a batch are taken during a window and are stored so that they are all available at the end of the window for processing. Each batch is processed individually, and the resulting noise index is used immediately.

Thus, referring to FIG. 2, the shift-invariant wavelet transformation of the in-cylinder pressure signals on bus 82, FIG. 2, is computed in the ECU 24, as described above in connection with FIG. 4, using the windowing described above, and is used to compute fuel injection parameters, such as start of fuel injection (SOI) and/or fuel injection quantity.

A comparison of the statistical standard deviation is presented between a shift-variant wavelet transform using Coiflet 2 and bior2.4 wavelets, the shift-invariant wavelet transform using bior2.4 wavelets; and, a bandpass filter. The noise index for each method was calculated over 20 cycles on a diesel engine operating at 1000 rpm and 70 Nm. The standard deviation in db (mean over all cylinders) for the noise level from cycle to cycle using one level of coefficients and windowing between –40° and 100° around TDC, for various cases is quantified in Table I below:

TABLE I

| Method Sampling Frequency | bandpass filtering | shift-variant wavelet-based (Coiflet 2) | shift-variant wavelet-based (bior 2.4) | shift-invariant wavelet-based (bior 2.4) |
|---|---|---|---|---|
| 6.25 kHZ | 0.63 | 1.03 | 0.924 | 0.751 |
| 12.5 kHz | 0.583 | 1.19 | 0.947 | 0.704 |
| 25.0 kHz | 0.602 | 1.47 | 1.19 | 0.828 | and for two levels of coefficients in the TABLE II below:

TABLE II

| Method Sampling Frequency | shift-variant wavelet-based (Coiflet 2) | shift-invariant wavelet-based (Coiflet 2) |
|---|---|---|
| 8.33 kHz | 1.13 | 0.529 |
| 16.7 kHz | 1.27 | 0.469 |

The results in TABLE I show that variation is reduced for shift-variant transforms by using bior2.4 rather than Coiflet 2. However, the deviation of the biorthogonal wavelet is still considerably higher than that of traditional bandpass filtering. This difference is inherent to the shift-variance of the wavelet approach; depending on the phase of a periodic signal, the signal energy may or may not be captured with the one level of wavelet coefficients that is taken into account for noise calculation. This is supported by the lower standard deviation of the shift-invariant case, where the signal energy is always captured.

Retaining two levels of coefficients as in TABLE II further improves the performance of the shift-invariant wavelet-based noise meter, achieving results that are similar to or improved over the bandpass filter noise meter. However, the problem of capturing the signal energy for the shift-variant wavelet, as mentioned in the previous paragraph, is still present when retaining two levels. This is shown by its larger standard deviations relative to the shift-invariant case.

It is noted that the injection parameter computation using the noise assessment based on shift-invariant wavelet transforms may be used for the main injection or for the pilot injection That is, the shift invariant wavelet transform may be used in the assessment of noise due to the combustion of fuel from the pilot injection by considering only that part of the pressure trace which lies in the crank angle interval between start of injection for pilot injection and for main injections.

More particularly, during this interval fuel for the pilot combustion is injected, but not that for the main combustion yet; all the noise during this interval can be attributed to the pilot combustion. This pilot combustion noise can then be used to optimize the pilot injection specifically.

Figure 5:
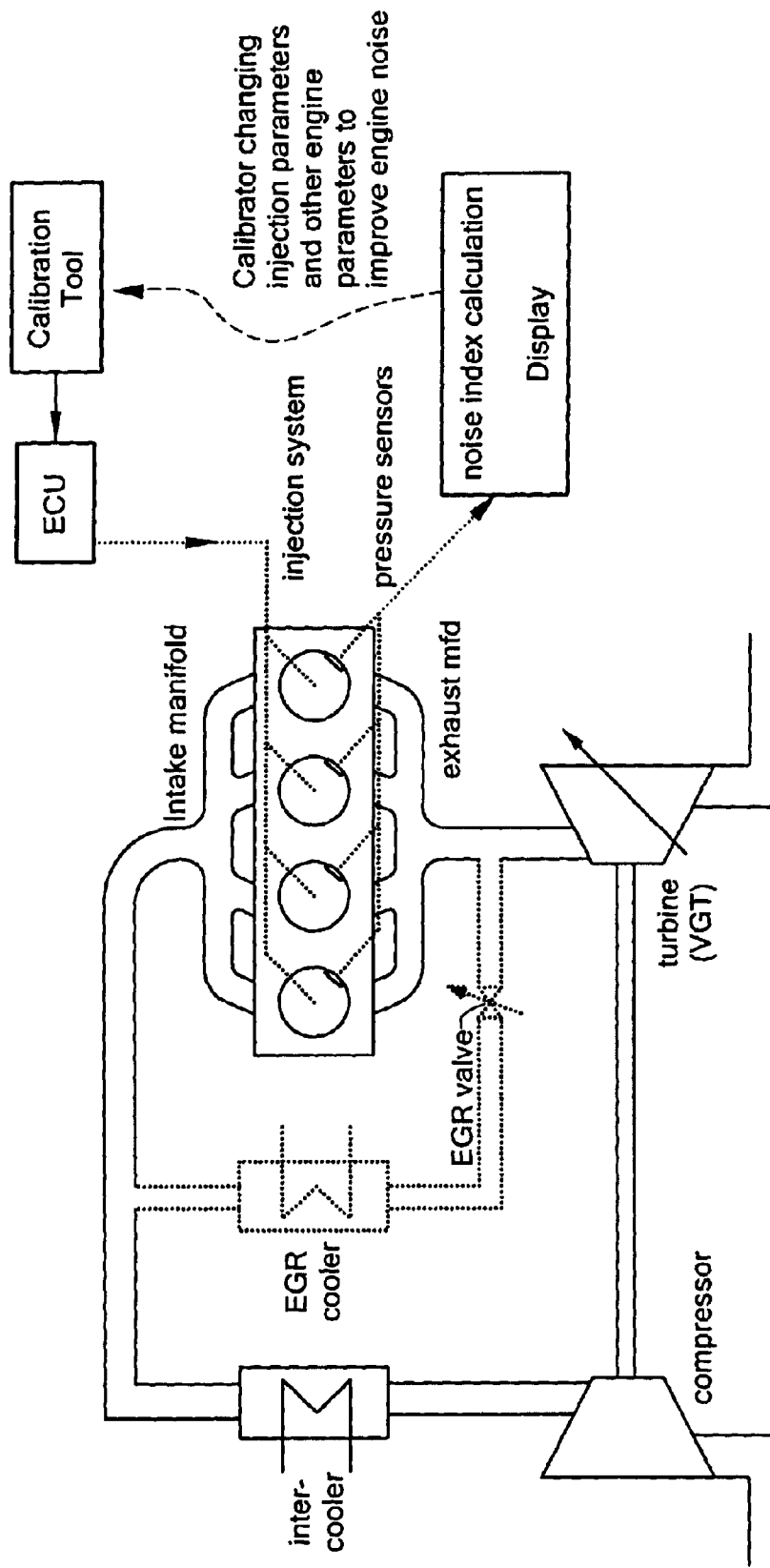
FIG. 5 is simplified block diagram of an internal combustion engine system having combustion noise assessment according to the invention, such noise assessment being used to adjust fuel injection parameters of the engine during calibration according to the invention.

A number of embodiments of the invention have been described. Nevertheless, it will be understood that various modifications may be made without departing from the spirit and scope of the invention. For example, FIG. 5 shows the shift invariant wavelet transform method used to calibrate fuel injection parameters during development rather than as part of a feedback control system to adjust fuel injection as a function of $NI_{WVL}$ during operation of the engine as shown in FIG. 2. Further, the system and method described above can be used to control EGR position, throttle position, fuel rail pressure, and/or VGT vane position to reduce combustion noise for diesel engine applications. Still further, the system and method described above can be used to control a charge motion control valve, EGR valve, and/or throttle angle to reduce combustion noise in a spark ignited gasoline engine. Still further, the system and method described above can be used in a homogenous-charge compression-ignition (HCCI) engine to adjust at least one of a position of a throttle valve, a temperature of the gases in the combustion chamber, and an amount of exhaust gases trapped in the combustion chamber to thereby reduce combustion noise in such an engine.

Accordingly, other embodiments are within the scope of the following claims.

What is claimed is:

1. An article of manufacture comprising:

a computer storage medium having a computer program encoded therein for assessing noise generated during combustion in an internal combustion engine, said computer storage medium comprising:

code for determining a noise index by processing samples of a signal generated in a cylinder of such engine in accordance with a shift invariant wavelet transform, such processed samples being only samples taken during a window less than a full engine cycle.

2. An article of manufacture comprising:

a computer storage medium having a computer program encoded therein for assessing noise generated during combustion in an internal combustion engine, said computer storage medium comprising:

code for determining a noise index, $NI_{WVL}$, by processing a signal generated in a cylinder of such engine in accordance with a shift invariant wavelet transform, $NI_{WVL}$ is:

$$NI_{WVL} = 20 \cdot \log_{10}\left(\frac{c}{n} \cdot \sqrt{\sum_{j_m} \frac{1}{2^{j_m}} \sum_k |\gamma_{j_m,k}|^2}\right)$$

where c is a constant used for scaling, n is the number of samples of the pressure signal being transformed, $j_m$ indicates the $j_m$th level of the shift invariant wavelet transform, and k is the running index.

3. The article of manufacture recited in claim 2 wherein the signal is processed to assess pilot fuel injection noise.

4. The article of manufacture recited in claim 3 wherein such pilot combustion noise assessment is made by such code by considering only that part of the pressure signal lying in a crank angle interval between start of injection for pilot injection and for main injection.

5. The article of manufacture recited in claim 2 wherein such storage medium is a semiconductor chip.

6. A method for assessing noise generated during combustion in an internal combustion engine, comprising determining a noise index by processing samples of a signal generated in a cylinder of such engine in accordance with a shift invariant wavelet transform, such processed samples being only samples taken during a window less than a fill engine cycle.

7. A method for assessing noise generated during combustion in an internal combustion engine, such method comprising:

determining a noise index by processing a signal generated in a cylinder of such engine in accordance with a shift invariant wavelet transform.

8. The method recited in claim 7 wherein the noise index, $NI_{WVL}$ is:

$$NI_{WVL} = 20 \cdot \log_{10}\left( \frac{c}{n} \cdot \sqrt{\sum_{j_m} \frac{1}{2^{j_m}} \sum_k |\gamma_{j_m,k}|^2} \right)$$

where c is a constant used for scaling, n is the number of samples of the pressure signal being transformed, $j_m$ indicates the $j_m$th level of the shift invariant wavelet transform, and k is the running index.

9. The method recited in claim 7 wherein the signal is processed to assess pilot combustion noise associated with pilot injection.

10. The method recited in claim 9 wherein such pilot combustion noise assessment is made by considering only that part of the pressure signal lying in a crank angle interval between start of injection for pilot injection and for main injection.

11. The method recited in claim 7 wherein the noise assessment is made during operation of the engine and the noise index is used to adjust fuel injection parameters for the engine.

12. The method recited in claim 7 wherein the signal is processed to adjust at least one of EGR, VGT angle, and throttle angle to reduce combustion noise.

13. The method recited in claim 12 wherein the engine is a diesel engine.

14. The method recited in claim 12 wherein the engine is a spark ignited gasoline engine.

15. The method recited in claim 14 wherein the signal is processed to adjust at least one of a postion of a charge motion control valve, EGR valve, and a throttle angle to reduce combustion noise.

16. The method recited in claim 12 wherein the engine is a HCCI engine.

17. The method recited in claim 7 wherein the engine is a HCCI engine and wherein the signal is processed to adjust at least one of a position of a throttle valve, a temperature of the gases in the combustion chamber, and an amount of exhaust gases trapped in the combustion chamber to reduce combustion noise.

* * * * *